July 8, 1952  L. L. BIRD  2,602,535

AUTOMATIC CLOTH COUNTER AND CONVEYER

Filed Oct. 30, 1947

INVENTOR.
LAWRENCE L. BIRD,
BY
ATTORNEYS

Patented July 8, 1952

2,602,535

UNITED STATES PATENT OFFICE 2,602,535

AUTOMATIC CLOTH COUNTER AND CONVEYER

Lawrence L. Bird, Indianapolis, Ind.

Application October 30, 1947, Serial No. 783,003

4 Claims. (Cl. 198—40)

This invention relates to a machine for automatically counting cloths, diapers, or similar articles. At the present time, a number of companies are engaged in the business of supplying wiping cloths and similar articles to users on what is in effect a rental basis, the supplier owning the cloths and periodically exchanging a quantity of laundered cloths for a quantity of soiled ones. Counting of cloths returned to the supplier is a necessary operation in order that the user may be held accountable for cloths not returned. Because of variations in the weight of individual cloths, especially when soiled, the weighing of a batch of returned cloths to determine their number is too inaccurate to be practical, and expensive manual counting of cloths is therefore generally resorted to.

It is the object of this invention to produce a machine by which the number of individual cloths in a disordered batch thereof may be counted with a satisfactory degree of accuracy. A further object of the invention is to produce a machine which will separate cloths individually from a disordered batch of cloths and which will count the individual cloths so separated. Still another object of the invention is to produce a machine which will be suitable for the indicated use and which can be simply and economically constructed.

The presently preferred embodiment of the invention comprises a receiving hopper having for its bottom wall the upper surface of an endless conveyor. Associated with such conveyor is a belt running over rollers positioned to provide an inclined belt-stretch which moves generally upwardly away from the conveyor and with a horizontal component of velocity opposite in direction to that of conveyor movement. Such belt is provided at spaced intervals with pins adapted to impale cloths carried toward the upwardly moving belt-stretch by the moving conveyor, the upwardly moving belt stretch having associated with it one or more strippers designed to remove all but one of the cloths engaging any individual hook. Beyond such stripper or strippers, the belt moves to a discharge point at which the individual cloths drop from it, desirably into a suitable container for future handling. Counting mechanism located in the path of cloth-travel beyond the last stripper counts the individual cloths.

Figure 1:
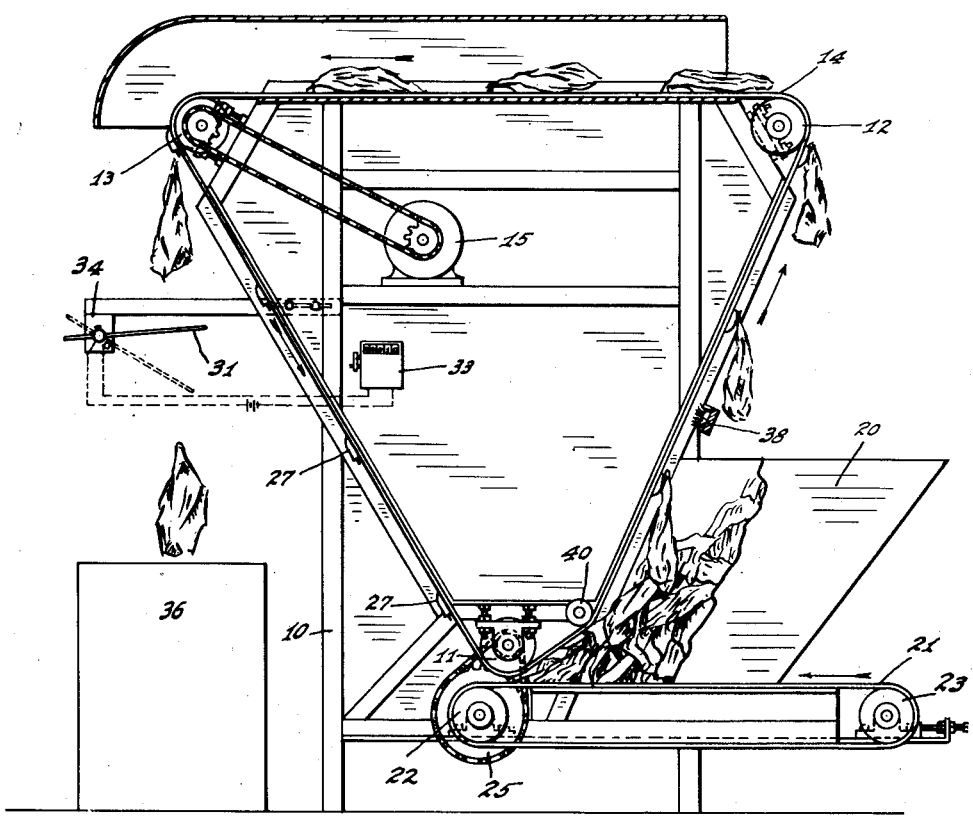

The accompanying drawing illustrates the invention: Fig. 1 is a side elevation of one form of cloth-counting machine with parts of the structure broken away, and Fig. 2 is a fragmental section on an enlarged scale, taken longitudinally of the belt and illustrating a detail of construction.

The machine illustrated in the drawing comprises a frame 10 providing a support for three horizontal, rotatable rollers 11, 12, and 13, over which a pick-up belt 14 is trained. Two of the rollers, shown as the rollers 12 and 13, are conveniently located at approximately equal elevations near the top of the frame 10, while the third roller, shown as the roller 11, is located near the bottom of the frame and horizontally between the rollers 12 and 13. A motor 15, or other driving means, supported on the frame 10 is operatively connected to one of the rollers to cause the belt to travel in the direction indicated by the arrows in Fig. 1.

Disposed at the side of the upwardly moving stretch of the belt 14 is a receiving hopper 20 the bottom of which is formed by the upper, horizontal stretch of an endless conveyor 21 mounted on horizontally spaced rollers 22 and 23 supported in any convenient fashion from the frame 10. The upper stretch of the conveyor 21 extends from the hopper 20 to and desirably somewhat beyond a point immediately beneath the roller 11, and the conveyor is adapted to be driven by any suitable means to cause its upper stretch to move toward the roller 11. As shown, the conveyor 21 is driven through a chain drive 25 which operatively interconnects the rollers 11 and 22, the roller 11 being driven by reason of its frictional engagement with the belt 14. Whatever means is employed to drive the conveyor 21, such conveyor desirably moves at a somewhat lower velocity than does the belt 14.

Figure 2:
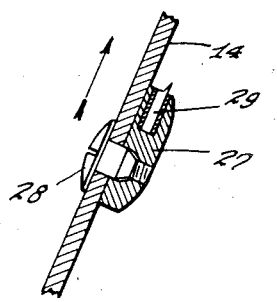

Mounted at longitudinally spaced intervals on the belt 14 are a series of cloth-impaling hooks, a preferred form of which is illustrated in Fig. 2. The hook there shown comprises a rigid body 27 which is secured to the outer face of the belt 14 by means of a screw 28 passing through the belt and into the body 27. At its front end, the body 27 is recessed for the reception of a sharply pointed pin 29 held in place in the body in any convenient manner.

The cloths successively picked up on the pins 29 are carried upwardly by the upwardly moving stretch of the belt 14, horizontally on the upper stretch of such belt, and over the roller 13. As the hook begins its travel along the downwardly moving stretch of the conveyor the cloth previously engaged by the hook falls therefrom under the influence of gravity. At some point in the path of travel of the individual cloths, a counting means is provided for counting such cloths. In the particular machine shown in the drawing such counting means takes the form of an arm 31 pivotally supported from the frame 10 on a horizontal axis and extending from its pivotal mounting into the path of cloths dropping from the downwardly moving stretch of the belt 14. The arm 31 is biased toward the generally horizontal position illustrated in Fig. 1, and is swingable about its axis of pivotal mounting, under the weight of a cloth dropped upon it, into an inclined cloth-releasing position such as is indicated in dotted lines in Fig. 1. Any suitable form of counter is employed to count the oscillations of the arm 31 caused by the cloths successively dropping upon it. Conveniently, the counter, indicated at 33 in Fig. 1, is electromagnetic in character and is adapted to be actuated by suitable switch mechanism 34 which is closed at each oscillation of the arm 31. A drum 36 or other suitable form of container may be placed at the side of the frame to receive the dropping cloths.

The design of the hook 27—29 illustrated in Fig. 2 is such as to minimize the likelihood that any hook will pick up more than one cloth from the batch of cloths in the hopper 20. To this end, the sharply pointed pin 29 projects from the front face of the body 27 for a distance of the order of the thickness of the cloths which are to be counted. Thus, when a cloth is impaled on the sharply pointed end of the pin 29, but little if any of such pin projects through the cloth far enough to engage and impale another. Moreover, the pin-supporting body 27 is made of small cross-sectional dimensions, and its edges are rounded as indicated in Fig. 2 to lessen the likelihood that the body itself will pick up and elevate a cloth.

Even though there is little likelihood that a pin 29 will itself engage more than a single cloth, it not infrequently happens that two cloths are so entangled that when one is elevated the other is elevated also. To separate any such entangled cloths and to remove all but one of a plurality of cloths engaged by a single hook, one or more strippers 38 may be associated with the upwardly moving stretch of the belt 14, such strippers being disposed close enough to the belt to engage and impart a frictional resistance on the upwardly moving cloths. It has been found that a bristle brush, such as a common scrub brush, makes an effective stripper. If a cloth engaging the stripper 38 is firmly impaled on a pin 29 the cloth will be drawn past the stripper and will continue on to be counted. However, if the cloth is not impaled on the pin, the stripper will retard the cloth until the hook clears it, whereupon the cloth will drop back into the hopper.

When a batch of cloths are to be counted by the machine, the counter 33 is set at zero, the cloths are emptied into the hopper 20, and the machine is started. The cloths in the hopper 20, being supported on the upper stretch of the conveyor 21, are carried thereby toward and into engagement with the upwardly moving stretch of the belt 14. As the pins 29 pass through them, cloths in the hopper become impaled by the pins and elevated from the hopper past the stripper 38. If more than one cloth should be elevated by any one hook, the stripper 38 will tend to retard it and cause its return to the hopper as above set forth. The conveyor 21 and the belt 14 cooperate in their action on the cloths to cause a continuous agitation thereof and a continuous presentation of new cloths to the outer surface of the belt 14 and to the hooks carried thereby, thus promoting the successive picking up of all the cloths by the hooks.

Cloths picked up successively by the hooks and carried past the stripper 38 move upwardly with the belt and thence horizontally from the roller 12 to the roller 13, being supported on the belt during this latter increment of travel. As the cloths pass over and beyond the roller 13, the force of gravity acting on them causes them to drop from the hooks to engage the counting arm 31 which actuates the counter 33 once for each cloth which engages it.

It has been found of advantage to arrange the lower portion of the upwardly moving stretch of the belt 12 so that it will leave the conveyor 21 at an angle of approximately 45° or less. It is not essential, however, that the upwardly moving stretch of the conveyor continue at such an angle for more than a short distance beyond the point at which it leaves the roller 11; and it is therefore convenient to mount on the frame 10 an idler 40 which, as will be clear from Fig. 1, deflects the lower portion of the upwardly moving stretch of the belt outwardly to decrease the angle between it and the upper stretch of the conveyor 21.

I claim as my invention:

1. In a machine for counting cloths and the like, a hopper for containing cloths to be counted, an endless belt, a pair of horizontally spaced upper rollers and a lower roller over which said belt is trained, a series of longitudinally spaced cloth-engaging hooks mounted on the exterior surface of said belt, means supporting said rollers on horizontal, parallel axes with the lower roller disposed between the vertical planes which respectively contain the axes of the upper rollers whereby said belt will possess two inclined stretches extending upwardly from said lower roller, means for driving said belt to cause one of said inclined stretches to move generally upwardly and the other generally downwardly, said hopper being disposed and arranged so that cloths therein will be in contact with the upwardly moving conveyor stretch, said hooks being presented forwardly with respect to the direction of belt movement whereby cloths engaged by hooks on the upwardly moving conveyor stretch will be elevated from the hopper and cloths engaged by hooks on the downwardly moving conveyor stretch will fall therefrom under the influence of gravity, a counter, and counter-actuating means disposed to be successively engaged by cloths falling from the downwardly moving conveyor stretch.

2. In a machine for counting cloths and the like, a hopper for containing cloths to be counted, an endless belt, a pair of horizontally spaced upper rollers and a lower roller over which said belt is trained, a series of longitudinally spaced cloth-engaging hooks mounted on the exterior surface of said belt, means supporting said rollers on horizontal, parallel axes with the lower roller disposed between the vertical planes which respectively contain the axes of the upper rollers whereby said belt will possess two inclined stretches extending upwardly from said lower roller, means for driving said belt to cause one of said inclined stretches to move generally upwardly and the other generally downwardly, said hopper being disposed and arranged so that cloths therein will be in contact with the upwardly moving conveyor stretch, said hooks being presented forwardly with respect to the direction of belt movement whereby cloths engaged by hooks on the upwardly moving conveyor stretch will be elevated from the hopper and cloths engaged by hooks on the downwardly moving conveyor stretch will fall therefrom under the influence of gravity, and cloth-counting means disposed adjacent the path of cloth-movement for successive actuation by cloths which have been elevated from said hopper.

3. The invention set forth in claim 2 with the addition of a cloth-engaging stripper disposed above said hopper, in advance of said cloth-counting means, and adjacent the upwardly moving belt-stretch to engage and impart a frictional drag on cloths carried upwardly thereby.

4. The invention set forth in claim 2 with the addition of means at the bottom of said hopper for moving cloths therein toward the upwardly moving belt-stretch.

LAWRENCE L. BIRD.

REFERENCES CITED

The following references are of record in the file of this patent:

UNITED STATES PATENTS

| Number | Name | Date |
| --- | --- | --- |
| 237,074 | Baldwin | Jan. 25, 1881 |
| 475,246 | Morton | May 17, 1892 |
| 718,067 | Adams | Jan. 13, 1903 |
| 1,846,232 | Turnbull | Feb. 23, 1932 |
| 2,340,214 | Feikert | Jan. 25, 1944 |